Aug. 21, 1928.
H. F. A. WACHTER
1,681,201
ANGLE BAR FOR SHOW WINDOWS AND THE LIKE
Filed Dec. 8, 1925
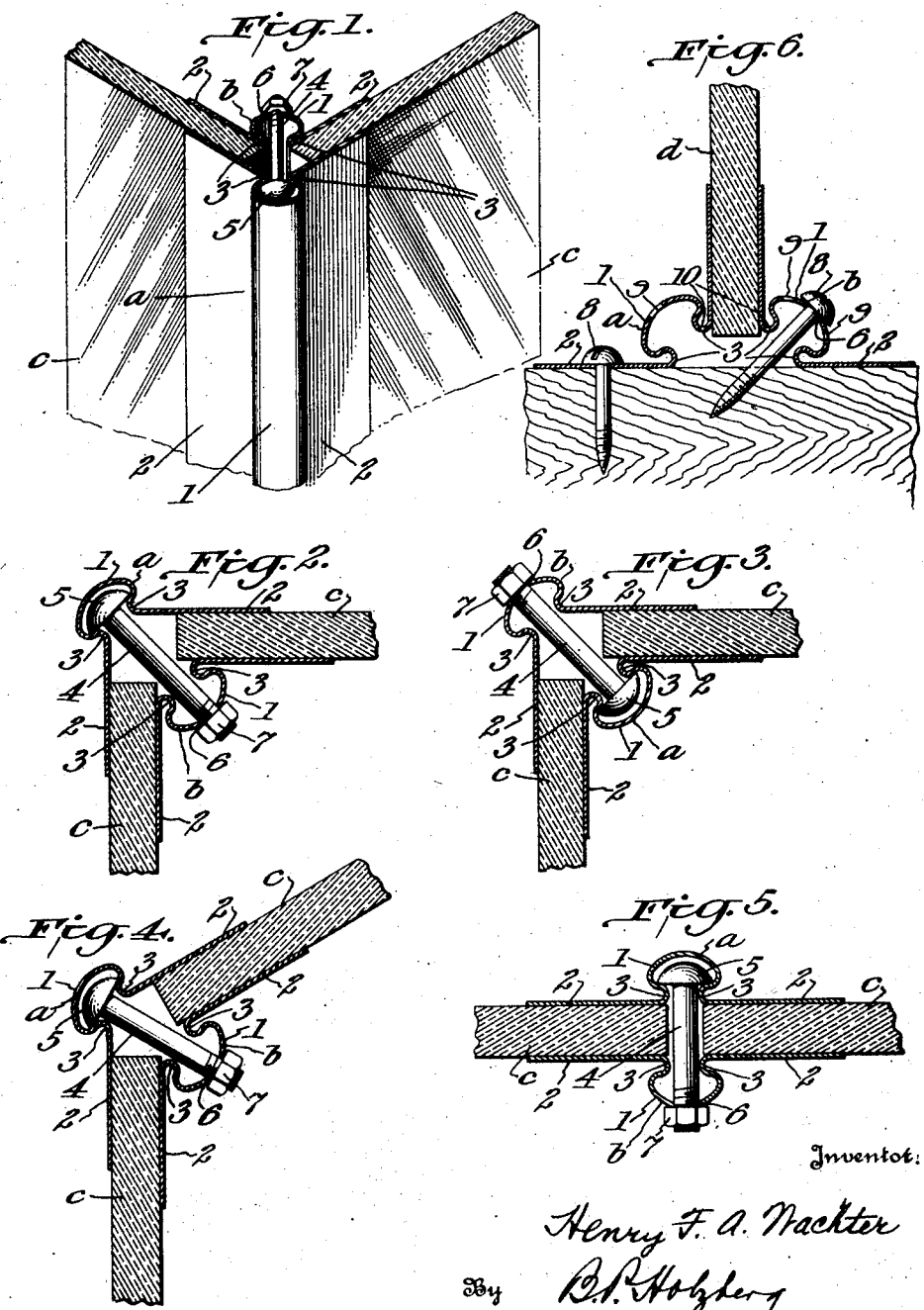
Inventor:
Henry F. A. Wachter
By B. P. Holzberg
Attorney.

Patented Aug. 21, 1928.

1,681,201

UNITED STATES PATENT OFFICE.

HENRY F. A. WACHTER, OF PERU, ILLINOIS.

ANGLE BAR FOR SHOW WINDOWS AND THE LIKE.

Application filed December 8, 1925. Serial No. 74,012.

The object of this invention is to provide an angle bar or pane connector for show windows, show cases, and other similar structures, wherein it is desired to connect two or more panes of glass without the use of mullions or corner posts, the device of my invention being of such a nature that it may be manufactured in large quantities at low cost and of relatively light weight material, but be, nevertheless, of sufficient longitudinal and transverse rigidity to fulfill all requirements of devices of this character.

The invention consists in an angle bar for show windows and the like, comprising, in a broad sense, a pair of similar, preferably interchangeable strips, adapted to be arranged at the juncture of and to contact with the opposite sides of panes of glass, or other plates, and in means for so connecting these strips that they will clamp the panes of glass, or plates, between them to form a substantially rigid joint at the juncture of the panes, without making necessary the use of any connecting means which pass directly through the panes of glass, as I will proceed now to explain and finally claim.

In the accompanying drawings illustrating the invention, in the several figures of which like parts are similarly designated, Figure 1 is a fragmentary sectional perspective view illustrating the device of my invention in its arrangement for connecting two panes of glass joining each other at an angle. Fig. 2 is a transverse sectional elevation showing the invention in substantially the same arrangement as illustrated in Fig. 1, wherein an unbroken finish is preserved upon the strip forming the outer edge of the corner. Fig. 3 is a view similar to Fig. 2, but showing the fastening means so arranged as to preserve an unbroken finish upon the strip at the interior of the corner angle. Fig. 4 illustrates the device of the invention in its use in connecting panes of glass which define between them an angle greater than a right angle. Fig. 5 illustrates the device of the invention in use as a connector between panes of glass arranged in line with each other, or, in other words, as a division bar. Fig. 6 shows the device of the invention when used as a means for connecting a pane of glass with a frame of wood, or other material.

As hereinbefore indicated, the device of the invention consists in a pair of substantially similar strips $a$ and $b$ each formed preferably of a single piece of bendable sheet metal of such gage and stiffness as to retain its shape when bent to any desired angle. These strips $a$ and $b$ have corner portions 1 of substantially oval shape in cross section, as shown, and are provided with wings 2 extending therefrom and adapted to engage with and frictionally hold the panes of glass $c$. At the points where the wings 2 diverge from the corner portions 1, lips 3 are formed and it is at these points that the bending of the wings takes place, as will be hereinafter pointed out, the substantially oval form of the corner portions 1 being thereby preserved.

The means for connecting these two strips, for the purpose of clamping the panes of glass between them, comprises a plurality of bolts 4 suitably spaced throughout the length of the strips and having their heads 5 lying within the corner portion of the strip $a$ and detachably and movably retained therein by the lips 3. These bolts pass through holes 6 provided in the corner portion 1 of the strip $b$ and clamping pressure is applied by means of nuts 7 threaded on the bolts and engaging the outer surface of the corner portion 1 of the strip $b$.

As hereinbefore pointed out, the strips designated $a$ and $b$ are similar and interchangeable and may, therefore, be cut from the same stock. The only difference between the two is made during their application by assembling the head 5 of the bolts 4 in the portion 1 of one of them and drilling holes 6 to accommodate these bolts in the other of them.

As shown in Figs. 1 and 2, where it is desired to provide an unbroken corner at the exterior of the angle defined by the panes of glass, the strip $a$ is used at the outside. The corner portion 1 of this strip having the heads of the bolts 4 lying within it and concealed by it, the outside of the angle presents a finished appearance. However, if it is desired to provide an unbroken finish upon the interior of the angle formed by the panes at their junction, it is merely necessary to suitably bend the wings 2 of the strips $a$ and $b$ so that the strip $a$ may be fitted to the interior of the angle, and the strip $b$ fitted to the exterior of the angle, thus providing the unbroken corner finish desired at the interior of the angle, and arranging the nuts 7 upon the exterior of the angle.

As illustrated in Figs. 4 and 5, the wings 2 of the strips $a$ and $b$ may be bent so as to accommodate the angle bar for use in connecting panes of glass meeting at any angle, such as an obtuse angle as shown in Fig. 4, or they may form a division bar, as shown in Fig. 5.

As shown in Fig. 6, the strips $a$ and $b$ may be used for connecting panes of glass with wood or other frames or sills, by bending their wings as shown, and attaching them in appropriate relationship to the pane of glass $d$ by means of screws 8 or other suitable fastening devices.

If desired, when thus arranged, the strips $a$ and $b$ may be provided with holes 9 for ventilating purposes, and drain holes 10 may be formed in them for an obvious purpose.

The provision of the substantially oval corner portions 1 of the strips makes for relatively great strength and rigidity at the joints due to the column formation produced thereby, thus offering ample resistance to wind and other pressures applied laterally of the joint, and of ample strength to carry loads applied longitudinally of the joint.

By providing strips for the formation of my angle bar which may be bent to accommodate the angle bar to any angle formed by the parts to be connected, I am able to obviate the necessity for the provision of the specially fabricated angle bars now generally in use, thus materially reducing construction costs.

The flexibility of my angle bars is such as to provide for movement of the members connected thereby due to the contraction and expansion incident to heat and cold, without injury either to the connected members or to the angle bars.

The strips may be made in various sizes and of various stiffness to suit them for the purposes for which they are to be used.

Although I have hereinbefore particularly described the invention in its application as an angle bar for connecting panes of glass in show windows and the like, it is to be understood that it is of equal utility in connecting sheets or plates of materials other than glass in the connection of the parts of various other articles and structures such as containers and cases of various sorts.

Changes in the device as described are contemplated as within the spirit of the invention and the scope of the following claim.

What I claim is:—

An angle bar for show windows and the like, comprising a pair of similar interchangeable pane-engaging strips adapted to be bent so as to be arranged at the juncture of the panes to be secured and contacting with opposite sides of said panes, and a bolt having its head detachably engaged by one of said strips and movable therein when in adjusted position and carrying a nut adjustably cooperating with the other of said strips for clamping the panes between the strips.

In testimony whereof I have hereunto set my hand this 28th day of November, 1925.

HENRY F. A. WACHTER.